US00RE35235E

United States Patent [19]

Beckerman

[11] E Patent Number: Re. 35,235

[45] Reissued Date of Patent: May 14, 1996

[54] METHOD AND APPARATUS FOR CONTROLLING REFRIGERANT GAS IN A LOW PRESSURE REFRIGERATION SYSTEM

[75] Inventor: Howard L. Beckerman, Middletown, N.J.

[73] Assignee: Mechanical Ingenuity Corp., Shrewsbury, N.J.

[21] Appl. No.: 317,222

[22] Filed: Oct. 3, 1994

Related U.S. Patent Documents

Reissue of:

[64] Patent No.: 5,307,643
Issued: May 3, 1994
Appl. No.: 50,894
Filed: Apr. 21, 1993

[51] Int. Cl.[6] ..... F25B 43/00

[52] U.S. Cl. ..... 62/77; 62/149; 62/298; 392/399

[58] Field of Search ..... 62/77, 85, 125, 62/126, 127, 129, 149, 298, DIG. 2, DIG. 17; 122/4 A, 13.2, 40; 392/324, 325, 400, 401, 399

[56] References Cited

U.S. PATENT DOCUMENTS

| | | | |
|---|---|---|---|
| 1,580,293 | 4/1926 | Fitzer | 392/399 |
| 2,490,547 | 12/1949 | Schraner et al. | 219/39 |
| 4,646,527 | 3/1987 | Taylor | 62/85 |
| 4,862,698 | 9/1989 | Morgan et al. | 62/77 |
| 4,864,829 | 9/1989 | Manning et al. | 62/85 |
| 4,878,458 | 11/1989 | Nelson | 122/4 A |
| 5,142,876 | 9/1992 | Snider et al. | 62/77 |

FOREIGN PATENT DOCUMENTS

| | | |
|---|---|---|
| 1207945 | 12/1965 | Germany . |
| 3158658 | 7/1991 | Japan . |
| 1512507 | 6/1978 | United Kingdom . |

*Primary Examiner*—Harry B. Tanner
*Attorney, Agent, or Firm*—David L. Davis

[57] ABSTRACT

A method and apparatus for controlling refrigerant gas pressure in a low pressure refrigeration system including a warm surface within a container. Liquid refrigerant is removed from the refrigeration system evaporator and sprayed on the warm surface, thereby vaporizing. The resulting pressure differential between the container and the evaporator causes the vaporized refrigerant to be returned to the evaporator through an open return line. The warm, surface is downwardly concave so that non-volatile liquid which had been mixed with the refrigerant can be collected from the bottom of the surface and transported to a location remote from the evaporator, thereby separating contaminants from refrigerant.

18 Claims, 2 Drawing Sheets

METHOD AND APPARATUS FOR CONTROLLING REFRIGERANT GAS IN A LOW PRESSURE REFRIGERATION SYSTEM

Matter enclosed in heavy brackets [ ] appears in the original patent but forms no part of this reissue specification; matter printed in italics indicates the additions made by reissue.

BACKGROUND OF THE INVENTION

This invention relates to low pressure refrigeration systems and, more particularly, to a method and apparatus for controlling the refrigerant gas pressure in such a system. Specifically, this invention relates to a method and apparatus whereby the refrigerant gas pressure may be quickly raised so as to avoid unwanted time delays when it is desired to leak test a low pressure refrigeration system.

A popular form of large air conditioning systems is a centrifugal chiller system wherein water is cooled and then piped to a heat exchanger for cooling circulated air. The basic components of such a system are an evaporator, a condenser, and a centrifugal compressor. The water is circulated in pipes within the evaporator and is cooled by refrigerant in the evaporator vessel. The cooled water is piped to a heat exchanger for cooling circulated air. Typically, such a system uses low pressure refrigerant, for example, R-11 or R-123. With such a refrigerant, at temperatures below approximately 75° F., the refrigerant is in a relative vacuum with respect to the ambient atmosphere in which the chiller system resides. As is conventional, such chiller systems are regularly subjected to leak tests to determine the location of leaks which develop, due to vibration, during the normal operation of the refrigeration system. Such leaks are undesirable in that they allow envirormentally deleterious refrigerant to escape during the operation of the refrigeration system and allow contaminants to enter the system when it is shut down or inoperative. To perform a leak test, the refrigerant lines must be pressurized. At one time, it was common to use nitrogen or air to pressurize the refrigerant lines. However, this technique is disadvantageous because after the leak test is completed, the lines must be purged of the nitrogen or air which was introduced for the test, resulting in a loss of refrigerant, in addition to requiring a substantial amount of time. Accordingly, various methods and apparatus have been developed whereby the pressure of the refrigerant gas itself is increased. All of these methods and apparatus known to the applicant involve the heating of the refrigerant to increase the refrigerant gas pressure. Thus, U.S. Pat. No. 4,862,698 discloses a system wherein chiller water is diverted to a heater and the heated water is circulated through the evaporator to heat the refrigerant therein. U.S. Pat. No. 4,864,829 discloses a system wherein the refrigerant within the evaporator is heated. U.S. Pat. No. 5,142,876 discloses a system wherein liquid refrigerant is removed from the evaporator, heated in an external heater, and returned to the evaporator. While effective, all of these disclosed systems have a common disadvantage. This disadvantage is that in order to raise the pressure of the refrigerant gas, the liquid refrigerant and the metal evaporator shell are heated, in addition to the water in the chiller pipes within the evaporator. Typically, an evaporator shell weighs approximately 1000 pounds and contains approximately 2000 pounds of liquid refrigerant. In addition, there is approximately 1000 pounds of chill water. It can be calculated that if it is desired to raise the temperature of the refrigerant from 50° F. to 80° F. in order to have sufficient pressure for a leak test, this requires the application of approximately 120,000 British Thermal Units, or approximately 35 kilowatt hours of heat energy. The amount of power that can be applied is limited because heat inputs of over 6 watts per square inch can cause overheating of the refrigerant and there are only about 2500 square inches of evaporator shell surface area available. Assuming high energy transfer efficiency, it will therefore take three hours for the refrigerant to reach the desired temperature if 12,000 watts of power are applied.

It is therefore a primary object of the present invention to provide a method and apparatus whereby leak testing of a low pressure refrigeration system can be accomplished in a time effective and energy efficient manner.

SUMMARY OF THE INVENTION

When leak testing a low pressure refrigeration system, the objective is to raise the pressure of the refrigerant gas, and heating 4000 pounds of liquids and solids is an ineffective way to raise the pressure of the 10 pounds of refrigerant gas contained within the evaporator. Accordingly, the foregoing and additional objects of this invention are attained by providing a method and apparatus for controlling the pressure of refrigerant gas in the refrigerant vessel of a low pressure refrigeration system wherein the refrigerant vessel holds both liquid and gas refrigerant. The inventive method and apparatus accomplishes the desired result by removing liquid refrigerant from the refrigerant vessel, vaporizing the removed liquid refrigerant, and returning the vaporized refrigerant to the vessel.

In accordance with an aspect of this invention, a warm surface is provided at a temperature at which liquid refrigerant vaporizes and the removed liquid refrigerant is applied to the warm surface.

In accordance with another aspect of this invention, the removed liquid refrigerant is sprayed onto the warm surface.

In accordance with a further aspect of this invention, the warm surface is downwardly concave and non-volatile liquid which had been mixed with the removed liquid refrigerant is collected from the lower reaches of the surface and transported to a location remote from the refrigerant vessel. Thus, contaminants are separated from the refrigerant.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
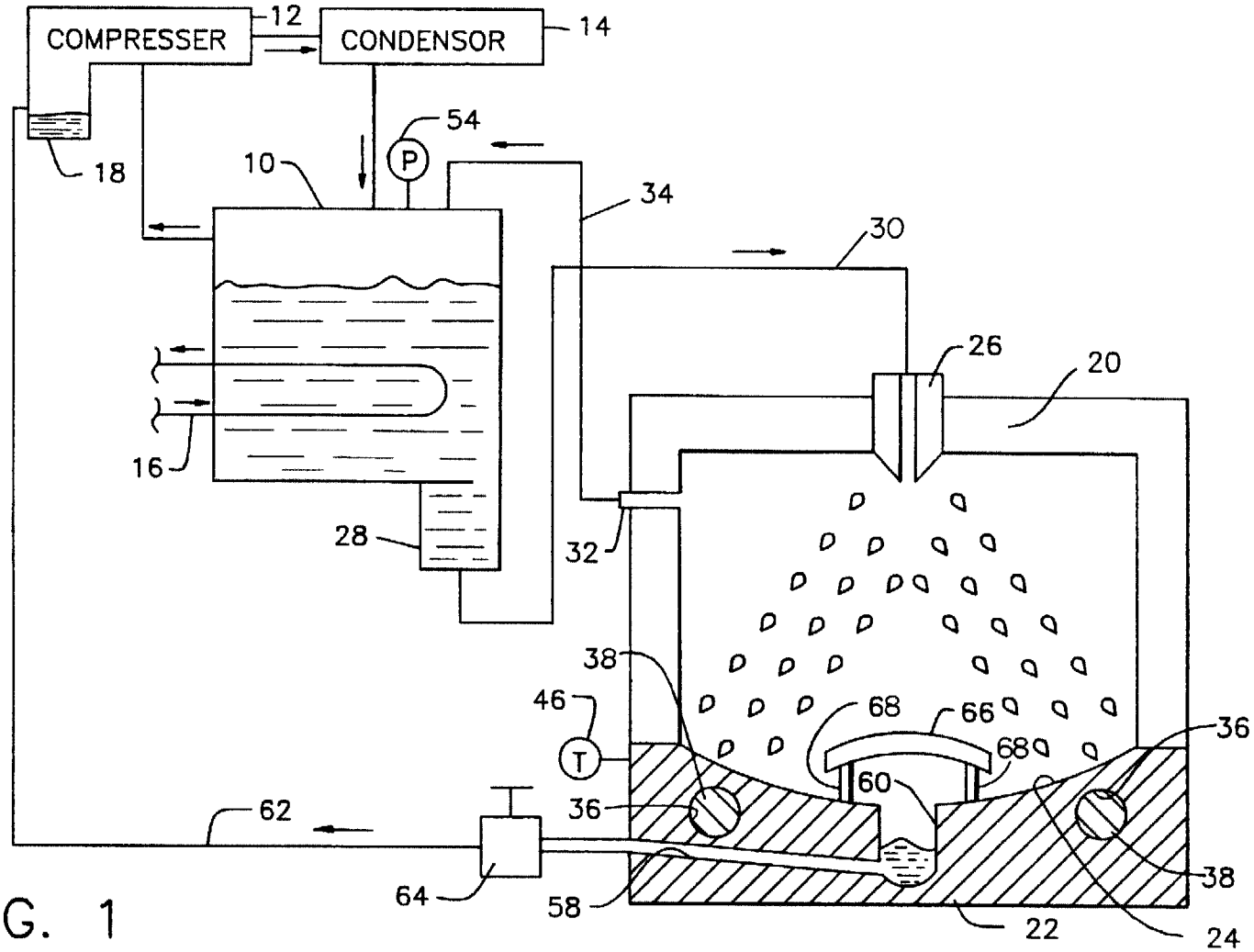
FIG. 1 schematically depicts a low pressure refrigeration system to which apparatus constructed according to this invention is appended.

FIG. 1 schematically illustrates a low pressure refrigeration system having an evaporator 10, a compressor 12 and a condenser 14 arranged for refrigerant flow in a closed loop, as is conventional and well known. Thus, as is known, the evaporator 10 is a refrigerant vessel holding refrigerant in both liquid and gaseous form. Water circulates through piping 16 submerged in the liquid refrigerant within the evaporator 10 for cooling thereby. The chilled water is pumped to a heat exchanger (not shown) for cooling circulated air. As part of the compressor 12, there is an oil sump 18 which is used for holding oil to lubricate the bearing surfaces of the compressor 12. The foregoing is well known and conventional in the art, and no further explanation thereof is deemed necessary.

The applicant has recognized that rather than heating the approximately 4000 pounds of liquid and solids making up and contained within the evaporator 10, it is more effective to directly increase the pressure of the refrigerant gas within the evaporator 10. Thus, as will be described in full detail hereinafter, a portion of the liquid refrigerant is removed from the evaporator 10, the removed liquid refrigerant is vaporized, and the vaporized refrigerant is returned to the evaporator 10. This vaporized refrigerant is at a higher temperature than the refrigerant within the evaporator 10 so therefore its pressure is higher. Additionally, any non-volatile liquid, such as oil from the compressor 12, which had been mixed with the liquid refrigerant is separated from the vaporized refrigerant and transported to a location remote from the evaporator 10, preferably the oil sump 18.

As shown in FIG. 1, the gas generating apparatus for practicing the applicant's invention includes a container 20. Either as part of the container 20, or disposed within it, is a thermally conductive member 22. Illustratively, the member 22 is an aluminum block which is formed with a surface 24. The surface 24 is downwardly concave, or dish-shaped. A spray nozzle 26 is secured to the container 20 and extends therein in a region remote from the surface 24. The nozzle 26 is preferably of the automotive fuel injector type which atomizes incoming liquid into small droplets. The spray pattern of the nozzle 26 is such that it covers the surface 24, with the exception that the spray pattern preferably has an empty central conical area, for reasons to be explained hereinafter. A pump 28, illustratively of the automotive fuel injection type, receives liquid refrigerant from the evaporator 10 and is coupled to the inlet of the nozzle 26 by tubing 30. The pump 28 provides a low volume of high pressure liquid at its output, typically 120 psi at 0.5 gallons per minute. A fitting 32 extends into the interior of the container 20 and is coupled by means of tubing 34 to the evaporator 10. The aluminum block 22 is preferably formed with cavities 36 in which heaters 38 are installed. As will be described, the heaters 38 are controlled to maintain the temperature of the block 22 at approximately 100° F., which is sufficient to vaporize liquid refrigerant which comes into contact with the surface 24.

In operation, the pump 28 removes a portion of the liquid refrigerant from the evaporator 10 and transports it at high pressure through the tubing 30 to the nozzle 26. The nozzle 26 atomizes the liquid refrigerant into small droplets and sprays the droplets on the warm surface 24. The surface 24 is preferably roughened to increase its surface area. When the droplets contact the 100° F. surface 24, they vaporize. Refrigerant at 100° F. has a pressure of approximately 9 psi. Assuming at this time that the temperature within the evaporator 10 is less than 75° F., the internal pressure of the evaporator 10 will be negative. Accordingly, the vaporized refrigerant within the container 20 will be forced by the pressure differential between the container 20 and the evaporator 10 through the fitting 32 and the tubing 34 into the evaporator 10. The refrigerant gas within the container 20 cannot escape through the nozzle 26 due to the 120 psi pressure generated by the pump 28. As the pressure within the evaporator 10 increases, the rate of flow through the tubing 34 will decrease due to a lower pressure differential. However, for leak testing purposes, a pressure of only 5 psi within the evaporator 10 is required, so that there will always be at least a 4 psi pressure differential between the container 20 and the evaporator 10 when the pump 28 is running and the heaters 38 are powered.

Figure 2:
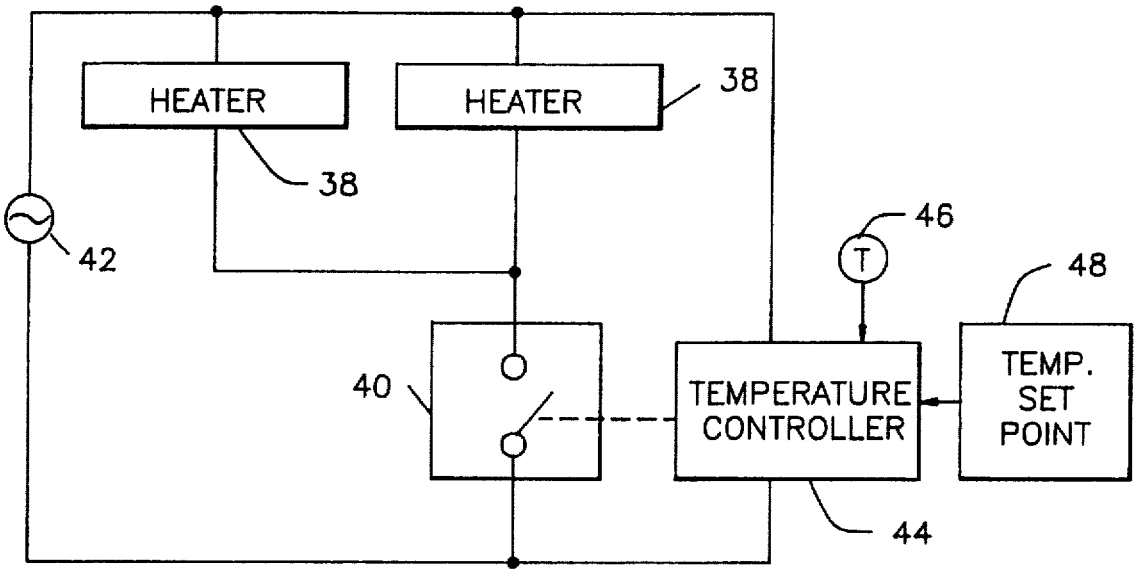
FIG. 2 is a block diagram of circuitry for controlling the heaters shown in FIG. 1.

FIG. 2 shows illustrative circuitry for controlling the heaters 38. As shown therein, the heaters 38 are connected in parallel with each other and in series with a controllable switch 40 across a power supply 42. The switch 40 is controlled by the temperature controller 44 which has as its inputs the temperature sensor 46 and the temperature set point 48. As shown in FIG. 1, the temperature sensor 46 is in contact with the block 22 so as to sense its temperature. The temperature set point 48 is used to set the desired temperature of the block 22, and is illustratively set to 100° F., since higher temperatures can cause a breakdown of the refrigerant and should be avoided. When droplets of refrigerant contact the surface 24 and are vaporized, heat is removed from the block 22 and its temperature decreases. The temperature controller 44 will respond to this decrease in temperature and control the switch 40 so as to power the heaters 38, thereby maintaining the temperature of the block 22 at the desired temperature of 100° F. The block 22 can be maintained at this temperature at all times, even when the pump 28 is turned off, since at 100° F. it is just above the normal body temperature of 98.6° F. and does not represent a hazard to either personnel or equipment. Although a separate switch 40, temperature controller 44, temperature sensor 46 and temperature set point 48 have been shown, it is understood that the same overall result can be attained by a single temperature sensing limit switch in series with the heaters 38. Further, although electrically powered heaters 38 have been shown, it is understood that other ways of heating the block 22 are possible, such as, for example, by causing water heated to a temperature of 100° F. to 120° F. to flow through the cavities 36.

Figure 3:
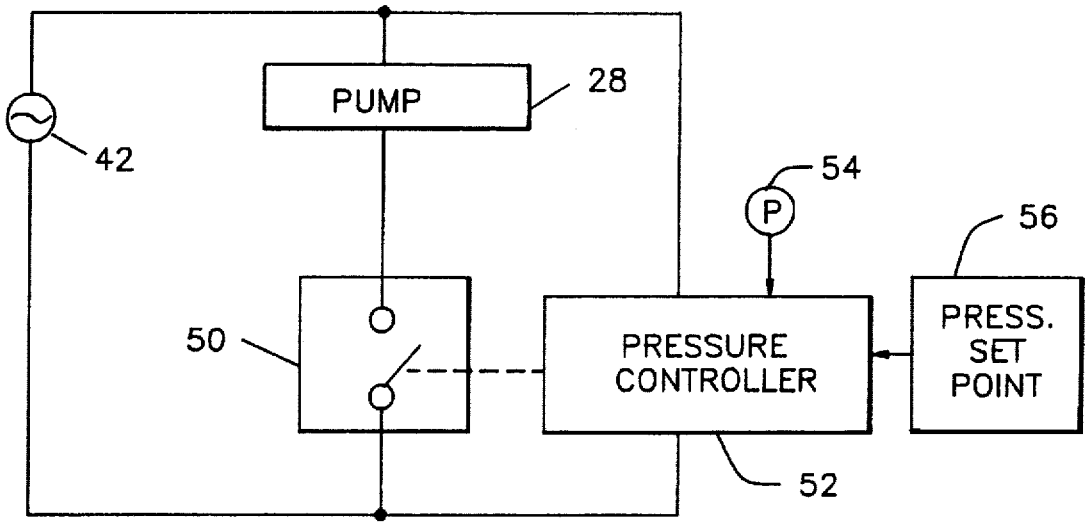
FIG. 3 is a block diagram of illustrative circuitry for controlling the pump shown in FIG. 1.

FIG. 3 shows illustrative circuitry for controlling the pump 28. As shown, the pump 28 is in series with the controllable switch 50 across the power supply 42. The switch 50 is controlled by the pressure controller 52 which has as its inputs the pressure sensor 54 and the pressure set point 56. As shown in FIG. 1, the pressure sensor 54 senses the refrigerant gas pressure within the evaporator 10. If the disclosed apparatus is to be utilized for leak testing, then the pressure set point 56 is set to the desired leak test pressure, illustratively 5 psi. It is understood that the apparatus according to the present invention can be utilized for electronic pressure sealing, as disclosed in U.S. Pat. No. 4,864,829, and the pressure set point 56 would then be set accordingly. Although a separate switch 50, pressure controller 52, pressure sensor 54 and pressure set point 56 have been shown, it is understood that if only a single high pressure is desired, such as 5 psi for leak testing, the same overall result can be attained by a single pressure sensing limit switch in series with the pump 28.

As previously described, liquid contaminants such as oil from the compressor 12 sometimes mix with the liquid refrigerant. Advantageously, the aforedescribed inventive apparatus provides a way of separating these contaminant liquids from the refrigerant. Fortunately, these contaminant liquids are not as volatile as the refrigerant and therefore do not vaporize upon contacting the 100° F. surface 24. The surface 24 is downwardly concave so that the non-volatile liquid droplets which reach the surface 24 are propelled under the influence of gravity toward the lowest region of the surface 24. According to this invention, the block 22 is formed with a conduit 58 which opens to the surface 24 at the low region. Preferably, part of the conduit 58 is formed as a sump, or well, 60 which collects the non-volatile liquid which runs down the surface 24. The conduit 58 is connected by the tubing 62 to the oil sump 18 of the compressor 12, and the positive pressure differential between the interior of the container 20 and the oil sump 18 causes the collected non-volatile liquid to flow through the conduit 58 and the tubing 62 to the oil sump 18. If desired, a valve 64, illustratively a needle valve, can be provided in the tubing 62 to control the rate of flow of the collected liquid.

As was mentioned, the spray pattern of the nozzle 26 is preferably empty at its center. This is to prevent liquid refrigerant from being sprayed directly into the collecting sump 60 and insure that it first strikes the warm surface 24 from which it is vaporized. To further this objective, a shield 66, illustratively a thin aluminum plate, is provided over the sump 60. The shield 66 is mounted to the block 22 by feet 68, or other structure having openings therein, to allow the nonvolatile liquid to run down the surface 24 and be collected in the sump 60.

In summary, it is much faster to warm 10 pounds of gas than 4000 pounds of liquid and solids. Even though eventually, over time, the gas will condense on all cold surfaces, warming them and cooling the gas, the pressure can be raised quickly to perform leak testing. It has been found that within the evaporator 10, the gas stratifies with warmer gas being higher and colder gas being near the liquid refrigerant at the bottom of the evaporator 10. However, when the inventive apparatus is operative, the pressure in the evaporator 10 rises quickly. Over extended periods of time, the gas and all the liquids and solids would be at the same temperature, but the inventive gas generator continues to supply more warm gas to take the place of gas which has cooled or condensed to liquid form, thereby keeping the pressure within the evaporator 10 elevated so that leak testing (or electronic pressure sealing) can be effected. The net effect of the inventive apparatus and method is the opposite of that in the aforereferenced patents. In the aforereferenced patents, a large amount of input power for a long time is required before the evaporator pressure rises to the desired level. At that point, those systems can have their power input cut back to a maintenance level. In contrast, the inventive gas generator apparatus raises the evaporator pressure almost immediately, using a small amount of power. However, with the inventive gas generator, it will take a long time for all of the liquids and solids to warm up to a uniform temperature. But the desired effect is raising the pressure, not heating the liquids and solids.

Accordingly, there has been disclosed an improved method and apparatus for controlling refrigerant gas pressure in a low pressure refrigeration system. This apparatus is readily appended to an existing system without affecting the normal operation thereof. It is understood that the above-described embodiment is merely illustrative of the application of the principles of this invention. Numerous other embodiments may be devised by those skilled in the art without departing from the spirit and scope of this invention, as defined by the appended claims.

I claim:

1. A method for controlling the pressure of refrigerant gas in the refrigerant vessel of a low pressure refrigeration system, the refrigerant vessel holding both liquid and gas refrigerant, the method comprising the steps of:

removing liquid refrigerant from said vessel;

vaporizing the removed liquid refrigerant; [and]

returning the vaporized refrigerant to said vessel[.];

*sensing the pressure of refrigerant gas in said refrigerant vessel; and*

*terminating the removing step when the sensed pressure reaches a predetermined value.*

2. The method according to claim 1 wherein the step of vaporizing includes the steps of:

providing a warm surface; and applying said removed liquid refrigerant to said warm surface.

3. The method according to claim 2 wherein the step of providing includes the steps of:

providing a thermally conductive member having a surface to which the removed liquid refrigerant is applied; and selectively heating said member to maintain the temperature of said member at a predetermined level.

4. The method according to claim 2 wherein the step of applying includes the steps of:

forming droplets of said removed liquid refrigerant; and directing the droplets onto said warm surface.

5. The method according to claim 1 further including the steps of:

separating non-volatile liquid from the removed liquid refrigerant; and transporting the separated non-volatile liquid to a location remote from said refrigerant vessel.

6. The method according to claim 1 wherein the step of vaporizing includes the step of:

spraying the removed liquid refrigerant onto a warm surface.

7. The method according to claim 6 further including the steps of:

collecting from said warm surface non-volatile liquid which had been mixed with the removed liquid refrigerant; and transporting the collected non-volatile liquid to a location remote from said refrigerant vessel.

[8. The method according to claim 1 further including the steps of:

sensing the pressure of refrigerant gas in said refrigerant vessel; and terminating the removing step when the sensed pressure reaches a predetermined value.]

9. A system for controlling the pressure of refrigerant gas in the refrigerant vessel of a low pressure refrigeration system, the refrigerant vessel holding both liquid and gas refrigerant, the system comprising:

a container;

a thermally conductive member disposed in said container, said member having a surface;

means for heating said member to a temperature at which liquid refrigerant in contact with said member surface will vaporize;

means for removing liquid refrigerant from said vessel;

means for applying the removed liquid refrigerant to said member surface within said container, whereby said removed liquid refrigerant vaporizes upon contacting said member surface; [and]

means for returning vaporized refrigerant from said container to said vessel[.];

*means for sensing the pressure of refrigerant gas in said vessel; and*

*means responsive to said pressure sensing means for controlling said removing means.*

[10. The system according to claim 9 further comprising:

means for sensing the pressure of refrigerant gas in said vessel; and means responsive to said pressure sensing means for controlling said removing means.]

11. The system according to claim 9 wherein said removing means includes a pump and said applying means includes a spray nozzle coupled to receive removed liquid refrigerant from said pump and direct a spray thereof toward said member surface.

12. The system according to claim 9 further comprising:

means for collecting from said member surface non-volatile liquid which had been mixed with said removed liquid refrigerant; and means for transporting the collected non-volatile liquid to a location remote from said refrigerant vessel.

13. The system according to claim 12 wherein said member surface is downwardly concave and said collecting means includes a conduit formed in said member and opening to said member surface at a location on said member surface to which non-volatile liquid is propelled under the influence of gravity.

14. The system according to claim 13 further comprising shield means interposed between said applying means and said conduit opening on said member surface for preventing the direct application of said removed liquid refrigerant to said member surface in the immediate vicinity of said conduit opening.

15. The system according to claim 9 further comprising:

means for sensing the temperature of said member; and means responsive to said temperature sensing means for controlling said heating means.

16. The system according to claim 9 wherein said removing means includes an electrically powered pump, [and] said applying means includes a spray nozzle coupled to receive removed liquid refrigerant from said pump and direct a spray thereof toward said member surface, *and* the [system further comprising:

means for sensing the pressure of refrigerant gas in said vessel; and]

means responsive to said pressure sensing means [for controlling] *controls* the application of electric power to said pump.

17. The system according to claim 16 further comprising:

means for sensing the temperature of said member; and means responsive to said temperature sensing means for controlling said heating means.

18. The system according to claim 9 wherein the refrigeration system includes a compressor having an oil sump, said member surface is downwardly concave, and said member is formed with a conduit therethrough which opens to said member surface at a location thereon to which non-volatile liquid which had been mixed with said removed liquid refrigerant and applied to said member surface is propelled under the influence of gravity, the system further comprising:

means communicating with said member conduit and said compressor oil sump for providing a flow path for said non-volatile liquid from said container to said compressor oil sump.

19. The system according to claim 18 further comprising valve means associated with said flow path providing means for regulating the flow of said non-volatile liquid.

20. The system according to claim 18 wherein said removing means includes a pump and said applying means includes a spray nozzle coupled to receive removed liquid refrigerant from said pump and direct a spray thereof toward said member surface, the system further comprising:

a shield plate mounted to and spaced from said member surface, said shield plate being so sized and positioned that removed liquid refrigerant sprayed from said nozzle is prevented from directly reaching said member surface in the immediate vicinity of the opening of said conduit to said member surface.

* * * * *